US012530730B2

(12) United States Patent
Gopalakrishnan et al.

(10) Patent No.: US 12,530,730 B2
(45) Date of Patent: Jan. 20, 2026

(54) QUANTUM COMPUTING AND BLOCKCHAIN ENABLED LEARNING MANAGEMENT SYSTEM

(71) Applicant: Bank of America Corporation, Charlotte, NC (US)

(72) Inventors: Lingaraj Gopalakrishnan, Chennai (IN); Anmol Puri, Gurugram (IN); Avinash Basavant Nigudkar, Mumbai (IN); Vijay Kumar Battiprolu, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 253 days.

(21) Appl. No.: 18/349,358

(22) Filed: Jul. 10, 2023

(65) Prior Publication Data

US 2025/0022085 A1    Jan. 16, 2025

(51) Int. Cl.
  *G06Q 50/20* (2012.01)
  *G06N 10/20* (2022.01)
  *G06N 10/60* (2022.01)

(52) U.S. Cl.
  CPC ........... *G06Q 50/205* (2013.01); *G06N 10/20* (2022.01); *G06N 10/60* (2022.01)

(58) Field of Classification Search
  CPC ......... G06Q 50/20; G06N 10/20; G06N 10/60
  See application file for complete search history.

(56) References Cited

U.S. PATENT DOCUMENTS

| 10,176,433 B2 | 1/2019 | Hastings et al. |
| 11,232,357 B2 | 1/2022 | Dalli et al. |
| 11,436,519 B1* | 9/2022 | Dridi ................ G06N 20/00 |
| 11,580,321 B2 | 2/2023 | Wentz |
| 11,605,016 B2 | 3/2023 | Heckey et al. |
| 2018/0246393 A1* | 8/2018 | Inagaki ................ G02F 3/00 |

(Continued)

FOREIGN PATENT DOCUMENTS

CN      107515909 B      5/2020

OTHER PUBLICATIONS

Bian, Zhengbing, et al. "Mapping constrained optimization problems to quantum annealing with application to fault diagnosis." Frontiers in ICT 3 (2016): 14. (Year: 2016).*

*Primary Examiner* — Scott M Tungate (57) ABSTRACT

A method includes receiving a learning requirement for a user. A preliminary learning recommendation is generated based on the learning requirement of the user and learning histories of a plurality of users. The preliminary learning recommendation is filtered to generate a filtered learning recommendation. A problem of finding an improved learning recommendation from the filtered learning recommendation is mapped to a quantum Ising model. A quantum annealing process is performed one or more times to determine one or more final quantum states from an initial quantum state. One or more energies of the quantum Ising model are determined for the one or more final quantum states. A minimum energy is determined among the determined energies. A target quantum state that corresponds to the minimum energy is determined among the determined final quantum states. The improved learning recommendation is determined from the target quantum state and is sent to the user.

20 Claims, 2 Drawing Sheets

(56) References Cited

U.S. PATENT DOCUMENTS

| | | |
|---|---|---|
| 2019/0244680 A1 | 8/2019 | Rolfe et al. |
| 2020/0272683 A1 | 8/2020 | Ronagh et al. |
| 2020/0401916 A1 | 12/2020 | Rolfe et al. |
| 2021/0158232 A1 | 5/2021 | Bolt et al. |
| 2021/0158425 A1 | 5/2021 | Kasprowicz et al. |
| 2022/0107786 A1 | 4/2022 | Iwasaki |
| 2022/0319219 A1 | 10/2022 | Tsibulevskiy et al. |
| 2022/0366494 A1 | 11/2022 | Cella et al. |
| 2023/0147890 A1 | 5/2023 | Cao |
| 2023/0394609 A1* | 12/2023 | Robinson ....... G06Q 10/063112 |

* cited by examiner

QUANTUM COMPUTING AND BLOCKCHAIN ENABLED LEARNING MANAGEMENT SYSTEM

TECHNICAL FIELD

The present disclosure relates generally to learning management, and more specifically to a system and method for quantum computing and blockchain enabled learning management.

BACKGROUND

Technological advancements have revolutionized organizational learning and development, but when it comes to urgent skills training or employee training programs, what one often gets is a generic and non-customized learning experience. Current approaches for managing learning and developments are often fragmented, inefficient, and lack transparency, leading to suboptimal outcomes for both employees and organizations. Current learning management systems do not have feedback loops to measure training impact and do not have a high accuracy in matching users with appropriate contents.

SUMMARY

The system described in the present disclosure provides several practical applications and technical advantages that overcome the current technical problems with learning management.

In general, a system for quantum computing and blockchain enabled learning management comprises a learning management system operably coupled to a quantum computing system via a network. The system may be coupled to computing devices of users via the network. The learning management system monitors user behaviors of the users, determines learning histories of the users, and stores the learning histories in a memory of the learning management system. The learning management system receives a learning requirement for a first user and generates a preliminary learning recommendation based on the learning requirement of the first user and the learning histories of the users. The learning management system filters the preliminary learning recommendation to generate a filtered learning recommendation and maps a problem of finding an improved learning recommendation from the filtered learning recommendation to a quantum Ising model.

The quantum computing system prepares an initial quantum state. The quantum computing system performs a quantum annealing process one or more times to determine final quantum states from the initial quantum state. The quantum computing system determines energies of the quantum Ising model for the final quantum states and determines a minimum energy among the determined energies. The quantum computing system determines an optimal final quantum state that corresponds to the minimum energy among the determined final quantum states. The learning management system determines the improved learning recommendation from the optimal final quantum state and sends the improved learning recommendation to the first user. In certain embodiments, the above process is repeated one or more times until an instruction to stop the learning management process is received.

The system for quantum computing and blockchain enabled learning management allows for efficient management of a learning process of a plurality of users. By using a quantum processor implementing a quantum algorithm (e.g., quantum annealing algorithm), speed of the learning management process is increased due to quantum parallelism compared to classical algorithms executed by classical processors.

Accordingly, the following disclosure is particularly integrated into practical applications of: (1) efficient management of a learning process of a plurality of users; and (2) improving speed of the learning management process by using quantum processors that implement quantum algorithms.

In one embodiment, a system includes a learning management system and a quantum computing system communicatively coupled to the learning management system. The learning management system includes a memory configured to store learning histories for a plurality of users and a classical processor communicatively coupled to the memory. The classical processor is configured to monitor a user behavior for each user, determine a learning history of each user based on a respective user behavior, receive a learning requirement for a first user, generate a preliminary learning recommendation based on the learning requirement of the first user and the learning histories of the plurality of users, filter the preliminary learning recommendation to generate a filtered learning recommendation, map a problem of finding an improved learning recommendation from the filtered learning recommendation to a quantum Ising model, determine the improved learning recommendation from a target quantum state of the quantum Ising model, and send the improved learning recommendation to the first user. The quantum computing system comprises a quantum processor implementing the quantum Ising model. The quantum processor is configured to prepare an initial quantum state, perform a quantum annealing process one or more times to determine one or more final quantum states from the initial quantum state, determine one or more energies of the quantum Ising model for the one or more final quantum states, determine a minimum energy among the one or more energies, and determine the target quantum state among the one or more final quantum states. The target quantum state corresponds to the minimum energy.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, where like reference numerals represent like parts.

DETAILED DESCRIPTION

Figure 1:
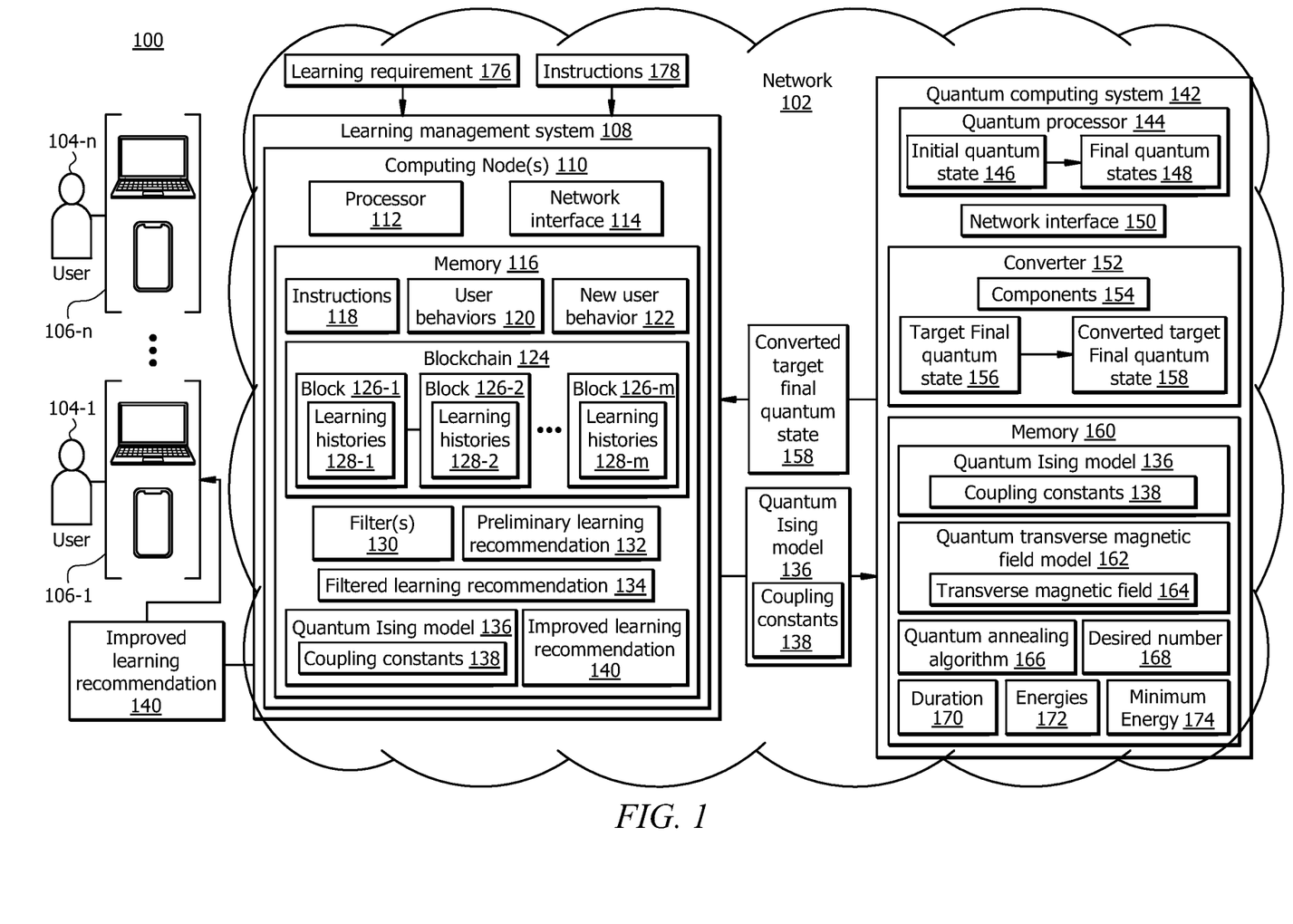
FIG. 1 illustrates an embodiment of a system for quantum computing and blockchain enabled learning management.
Figure 2:
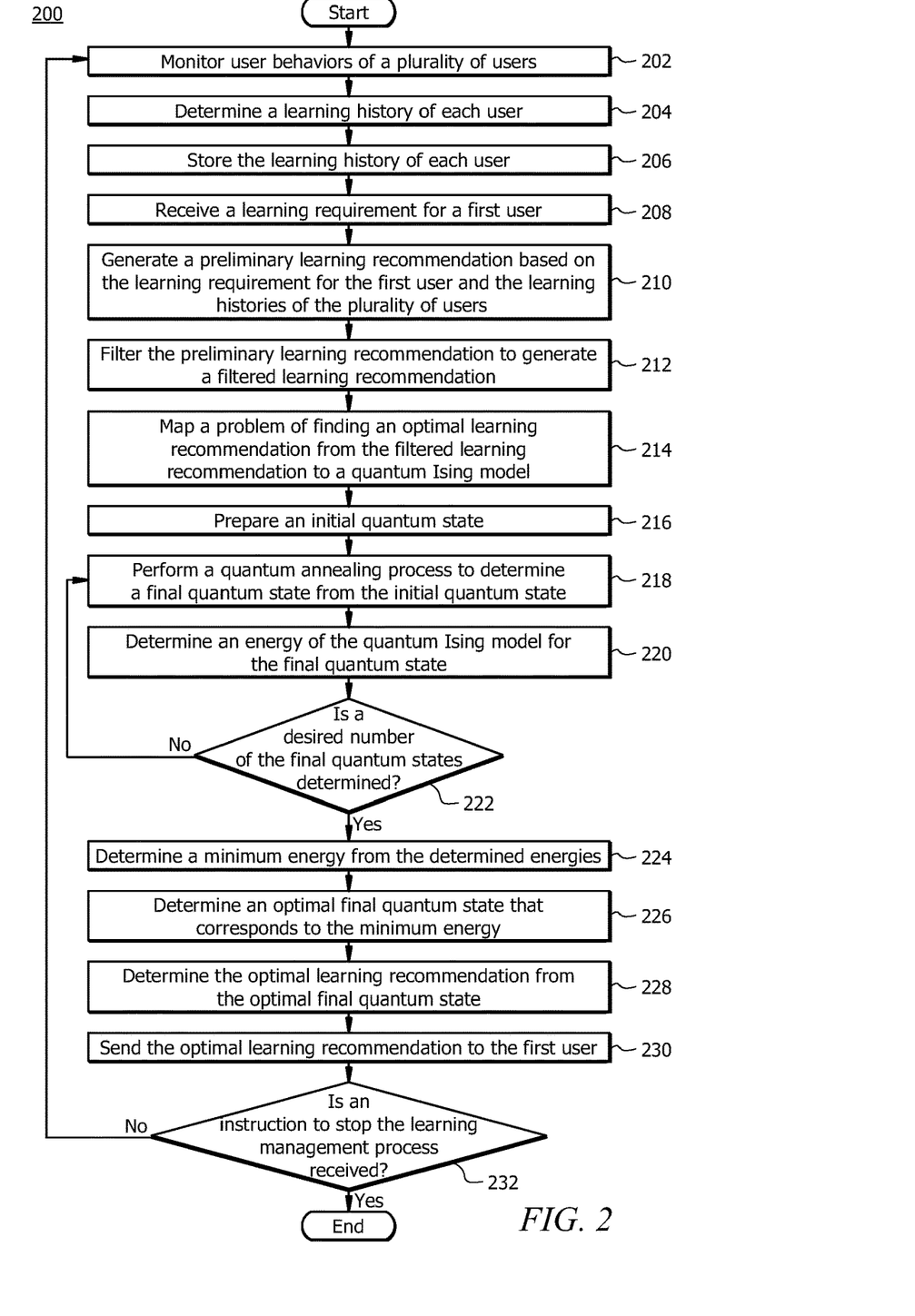
FIG. 2 illustrates an example operational flow of system of FIG. 1 for quantum computing and blockchain enabled learning management.

As described above, previous technologies fail to provide effective systems and methods for learning management. Embodiments of the present disclosure and their advantages may be understood by referring to FIGS. 1 and 2. FIGS. 1 and 2 are used to describe a system and method for quantum computing and blockchain enabled learning management.

System Overview

FIG. 1 illustrates an embodiment of a system 100 for learning management. In certain embodiments, the system 100 comprises a learning management system 108 operably coupled to a quantum computing system 142 via a network 102. Network 102 enables the communication between the components of the system 100. The system 100 may be coupled to a plurality of computing devices 106-1 through 106-n of users 104-1 through 104-n, respectively, via the network 102. In other embodiments, the system 100 may not have all the components listed and/or may have other elements instead of, or in addition to, those listed above. For example, the learning management system 108 and the quantum computing system 142 may be integrated into a single system.

In general, the learning management system 108 monitors user behaviors 120 of the plurality of users 140-1 through 104-n, determines learning histories (e.g., learning histories 128-m) of the users 140-1 through 104-n, and stores the learning histories (e.g., learning histories 128-m) in a memory 116 of the learning management system 108.

The learning management system 108 receives a learning requirement 176 for a first user (e.g., user 104-1) and generates a preliminary learning recommendation 132 based on the learning requirement 176 of the first user (e.g., user 104-1) and the learning histories (e.g., learning histories 128-m) of the users 104-1 through 104-n.

The learning management system 108 filters the preliminary learning recommendation 132 to generate a filtered learning recommendation 134. In certain embodiments, the filtering process comprises applying one or more filters 130 to the preliminary learning recommendation 132. The one or more filters 130 may include a content-based filter, a collaborative-based filter, and/or a knowledge-based filter. The learning management system 108 maps a problem of finding an improved learning recommendation 140 from the filtered learning recommendation 134 to a quantum Ising model 136.

The quantum computing system 142 prepares an initial quantum state 146. In certain embodiments, the initial quantum state 146 is a ground state of a quantum transverse magnetic field model 162. The quantum computing system 142 performs a quantum annealing process one or more times to determine final quantum states 148 from the initial quantum state 146. The quantum computing system 142 determines energies 172 of the quantum Ising model 136 for the final quantum states 148 and determines a minimum energy 174 among the determined energies 172. The quantum computing system 142 determines a target final quantum state 156 that corresponds to the minimum energy 174 among the determined final quantum states 148. The learning management system 108 determines the improved learning recommendation 140 from the target final quantum state 156 and sends the improved learning recommendation 140 to the first user (e.g., user 104-1). In certain embodiments, the above process is repeated one or more times until an instruction 178 to stop the learning management process is received.

System Components

Network

Network 102 may be any suitable type of wireless and/or wired network. The network 102 may or may not be connected to the Internet or public network. The network 102 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., WiFi, WiGig, WiMax, etc.), a long-term evolution (LTE) network, a universal mobile telecommunications system (UMTS) network, a peer-to-peer (P2P) network, a Bluetooth network, a near field communication (NFC) network, and/or any other suitable network. The network 102 may be configured to support any suitable type of communication protocol as would be appreciated by one of ordinary skill in the art.

Computing Devices

Each of computing devices 106-1 through 106-n is generally any device that is configured to process data and interact with a respective one of the user 104-1 through 104-n. Examples of the computing device include, but are not limited to, a personal computer, a desktop computer, a workstation, a server, a laptop, a tablet computer, a mobile phone (such as a smartphone), a virtual reality headset, etc. The computing device may include a user interface, such as a display, a microphone, keypad, or other appropriate terminal equipment usable by a respective user. Each of the computing devices 106-1 through 106-n may include a hardware processor, memory, and/or circuitry (not explicitly shown) configured to perform any of the functions or actions of the computing devices 106-1 through 106-n described herein. For example, software applications designed using software code may be stored in respective memories and executed by respective processors to perform the functions of the computing devices 106-1 through 106-n. The computing devices 106-1 through 106-n are configured to communicate with other components of the system 100 via the network 102. In operation, the computing devices 106-1 through 106-n of the users 104-1 through 104-n may receive improved learning recommendations (e.g., improved learning recommendation 140) from the learning management system 108.

Learning Management System

The learning management system 108 is generally any device that is configured to process data and communicate with other components of the system 100 via the network 102. The learning management system 108 may comprise a plurality of computing nodes 110. Each computing node 110 may comprise a processor 112 in signal communication with a memory 116 and a network interface 114.

Processor 112 comprises one or more processors operably coupled to the memory 116. The processor 112 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 112 may be a programmable logic device, a microcontroller, a microprocessor, or any suitable combination of the preceding. The one or more processors are configured to process data and may be implemented in hardware or software. For example, the processor 112 may be 8-bit, 16-bit, 32-bit, 64-bit, or of any other suitable architecture. The one or more processors are configured to implement various software instructions to perform the operations described herein. For example, the one or more processors are configured to execute software instructions 118 and perform one or more functions described herein. The processor 112 may be also referred to as a classical processor.

Network interface 114 is configured to enable wired and/or wireless communications (e.g., via network 102). The network interface 114 is configured to communicate data between the respective node 110 and other components of the system 100. For example, the network interface 114 may comprise a WIFI interface, a local area network (LAN) interface, a wide area network (WAN) interface, a modem, a switch, or a router. The processor 112 is configured to send and receive data using the network interface 114. The network interface 114 may be configured to use any suitable type of communication protocol as would be appreciated by one of ordinary skill in the art.

Memory 116 may be volatile or non-volatile and may comprise a read-only memory (ROM), random-access memory (RAM), ternary content-addressable memory (TCAM), dynamic random-access memory (DRAM), and static random-access memory (SRAM). Memory 116 may be implemented using one or more disks, tape drives, solid-state drives, and/or the like. The memory 116 may store any of the information described in FIGS. 1 and 2 along with any other data, instructions, logic, rules, or code operable to implement the function(s) described herein. The memory 116 is operable to store software instructions 118, and/or any other data and instructions. The software instructions 118 may comprise any suitable set of software instructions, logic, rules, or code operable to be executed by the processor 112. In certain embodiments, the memory 116 may further store a blockchain 124. The blockchain 124 comprises a plurality of blocks 126-1 through 126-$m$. The plurality of blocks 126-1 through 126-$m$ comprise learning histories 128-1 through 128-$m$. Each of the histories 128-1 through 128-$m$ comprises learning histories of the users 104-1 through 104-$n$.

In operation, the processor 112 of the learning management system 108 monitors user behaviors 120 of a plurality of users 140-1 through 104-$n$, determines learning histories (e.g., learning histories 128-$m$) of the users 140-1 through 104-$n$, and stores the learning histories (e.g., learning histories 128-$m$) of the users 140-1 through 104-$n$ in the memory 116 of the learning management system 108. In certain embodiments, the learning histories (e.g., learning histories 128-$m$) of the users 140-1 through 104-$n$ are stored in a block (e.g., block 126-$m$) of the blockchain 124 that is stored in the memory 116.

The processor 112 of the learning management system 108 receives a learning requirement 176 for a first user (e.g., user 104-1). In certain embodiments, the learning requirement 176 may be determined based on activities or tasks to be performed by the first user (e.g., user 104-1). The processor 112 of the learning management system 108 generates a preliminary learning recommendation 132 based on the learning requirement 176 of the first user (e.g., user 104-1) and the learning histories (e.g., learning histories 128-$m$) of the users 104-1 through 104-$n$. The processor 112 of the learning management system 108 filters the preliminary learning recommendation 132 to generate a filtered learning recommendation 134. In certain embodiments, the filtering process comprises applying one or more filters 130 to the preliminary learning recommendation 132. The one or more filters 130 may include a content-based filter, a collaborative-based filter, and/or a knowledge-based filter. The processor 112 of the learning management system 108 maps a problem of finding an improved learning recommendation 140 from the filtered learning recommendation 134 to a quantum Ising model 136. In certain embodiments, the mapping process comprises determining coupling constants 138 of the quantum Ising model 136. The processor 112 of the learning management system 108 determines the improved learning recommendation 140 from the target final quantum state 156 determined by the quantum computing system 142 (which implements the quantum Ising model 136) and sends the improved learning recommendation 140 to the first user (e.g., user 104-1). In certain embodiments, the processor 112 of the learning management system 108 monitors a new user behavior 122 of a plurality of the first user (e.g., user 104-1), and updates a learning history (e.g., respective one of learning histories 128-$m$) of the first user (e.g., user 104-1) based on the new user behavior 122.

Quantum Computing System

The quantum computing system 142 is generally any device that is configured to process data and communicate with other components of the system 100 via the network 102. The quantum computing system 142 may comprise a quantum processor 144 and a converter 152 in signal communication with a memory 160 and a network interface 150.

Quantum processor 144 may comprise one or more quantum processors operably coupled to the memory 160. The quantum processor 144 is configured to process quantum bits. The quantum processor 144 may comprise a superconducting quantum device (with qubits implemented by states of Josephson junctions), a trapped ion device (with qubits implemented by internal states of trapped ions), a trapped neutral atom device (with qubits implemented by internal states of trapped neutral atoms), a photon-based device (with qubits implemented by modes of photons), or any other suitable device that implements quantum bits with states of a respective quantum system. The quantum processor 144 is configured to implement the quantum Ising model 136 and the quantum transverse magnetic field model 162. The quantum processor 144 is further configured to execute a quantum annealing algorithm 166 to perform one or more functions described herein.

Converter 152 is configured to convert data items represented by classical binary bits to quantum bits. Converter 152 is further configured to convert data items represented by quantum bits to classical binary bits. In certain embodiments, the converter 152 comprises a plurality of components 154 that are configured to generate and manipulate quantum bits. In the illustrated embodiment, the plurality of components 154 and the quantum processor 144 are configured to operate on a same type of quantum bits. For example, when the quantum processor 144 comprises a photon-based device (with qubits implemented by modes of photons), the plurality of components 154 may comprise optical components such as lasers, mirrors, prisms, waveguides, interferometers, optical fibers, filters, polarizers, and/or lenses.

Network interface 150 is configured to enable wired and/or wireless communications (e.g., via network 102). The network interface 150 is configured to communicate data between the quantum computing system 142 and other components of the system 100. For example, the network interface 150 may comprise a WIFI interface, a local area network (LAN) interface, a wide area network (WAN) interface, a modem, a switch, or a router. The quantum processor 144 is configured to send and receive data using the network interface 150. The network interface 150 may be configured to use any suitable type of communication protocol as would be appreciated by one of ordinary skill in the art.

Memory 160 may be volatile or non-volatile and may comprise a read-only memory (ROM), random-access memory (RAM), ternary content-addressable memory (TCAM), dynamic random-access memory (DRAM), and static random-access memory (SRAM). Memory 160 may be implemented using one or more disks, tape drives, solid-state drives, and/or the like. The memory 160 may store any of the information described in FIGS. 1 and 2 along with any other data, instructions, logic, rules, or code operable to implement the function(s) described herein. The memory 160 may store the quantum annealing algorithm 166 operable to be executed by the quantum processor 144.

In operation, the quantum processor 144 of the quantum computing system 142 prepares an initial quantum state 146. In certain embodiments, the initial quantum state 146 is a ground state of a quantum transverse magnetic field model 162. The quantum processor 144 of the quantum computing system 142 performs a quantum annealing process one or more times to determine final quantum states 148 from the initial quantum state 146. In certain embodiments, performing the quantum annealing process comprises implementing the quantum annealing algorithm 166 by the quantum processor 144 of the quantum computing system 142. In certain embodiments, performing the quantum annealing process comprises performing a quantum adiabatic process that evolves the quantum transverse magnetic field model 162 into the quantum Ising model 136 for a desired duration 170 by reducing a transverse magnetic field 164 of the quantum transverse magnetic field model 162.

The quantum processor 144 of the quantum computing system 142 determines energies 172 of the quantum Ising model 136 for the final quantum states 148 and determines a minimum energy 174 among the determined energies 172. The quantum computing system 142 determines a target final quantum state 156 that corresponds to the minimum energy 174 among the determined final quantum states 148. In certain embodiments, the converter 152 of the quantum computing system 142 converts the target final quantum state 156 represented by quantum bits to a converted target final quantum state 158 represented by classical bits. Subsequently, the quantum processor 144 of the quantum computing system 142 sends the converted target final quantum state 158 to the learning management system 108.

Example Method for Quantum Computing and Blockchain Enabled Learning Management

FIG. 2 illustrates an example flowchart of a method 200 for quantum computing and blockchain enabled learning management. Modifications, additions, or omissions may be made to method 200. Method 200 may include more, fewer, or other operations. For example, operations may be performed in parallel or in any suitable order. For example, one or more operations of method 200 may be implemented, at least in part, in the form of the software instructions (e.g., instructions 118 and/or quantum annealing algorithm 166 of FIG. 1), stored on non-transitory, tangible, machine-readable medium (e.g., memories 116 and/or 160 of FIG. 1) that when executed by one or more processors (e.g., processors 112 and/or 144 of FIG. 1) may cause the one or more processors to perform operations 202-232.

Method 200 starts with operation 202, where a processor 112 of the learning management system 108 monitors user behaviors 120 of a plurality of users 140-1 through 104-n.

At operation 204, the processor 112 of the learning management system 108 determines a learning history (e.g., respective one of learning histories 128-m of FIG. 1) of each of the users 140-1 through 104-n.

At operation 206, the processor 112 of the learning management system 108 stores the learning history (e.g., respective one of learning histories 128-m of FIG. 1) of each of the users 140-1 through 104-n in a memory 116 of the learning management system 108. In certain embodiments, the learning history (e.g., respective one of learning histories 128-m of FIG. 1) of each of the users 140-1 through 104-n is stored in a block (e.g., block 126-m of FIG. 1) of a blockchain 124 that is stored in the memory 116.

At operation 208, the processor 112 of the learning management system 108 receives a learning requirement 176 for a first user (e.g., user 104-1 of FIG. 1). In certain embodiments, the learning requirement 176 may be determined based on activities or tasks to be performed by the first user (e.g., user 104-1 of FIG. 1).

At operation 210, the processor 112 of the learning management system 108 generates a preliminary learning recommendation 132 based on the learning requirement 176 of the first user (e.g., user 104-1 of FIG. 1) and the learning histories (e.g., learning histories 128-m of FIG. 1) of the users 104-1 through 104-n.

At operation 212, the processor 112 of the learning management system 108 filters the preliminary learning recommendation 132 to generate a filtered learning recommendation 134. In certain embodiments, the filtering process comprises applying one or more filters 130 to the preliminary learning recommendation 132. The one or more filters 130 may include a content-based filter, a collaborative-based filter, and/or a knowledge-based filter.

At operation 214, the processor 112 of the learning management system 108 maps a problem of finding an improved learning recommendation 140 from the filtered learning recommendation 134 to a quantum Ising model 136. In certain embodiments, the mapping process comprises determining coupling constants 138 of the quantum Ising model 136.

At operation 216, a quantum processor 144 of the quantum computing system 142 prepares an initial quantum state 146. In certain embodiments, the initial quantum state 146 is a ground state of a quantum transverse magnetic field model 162.

At operation 218, the quantum processor 144 of the quantum computing system 142 performs a quantum annealing process to determine a final quantum state 148 from the initial quantum state 146. In certain embodiments, performing the quantum annealing process comprises implementing the quantum annealing algorithm 166 by the quantum processor 144 of the quantum computing system 142. In certain embodiments, performing the quantum annealing process comprises performing a quantum adiabatic process that evolves the quantum transverse magnetic field model 162 into the quantum Ising model 136 for a desired duration 170 by reducing a transverse magnetic field 164 of the quantum transverse magnetic field model 162.

At operation 220, the quantum processor 144 of the quantum computing system 142 determines an energy 172 of the quantum Ising model 136 for the final quantum state 148.

At operation 222, the quantum processor 144 of the quantum computing system 142 determines if a desired number 168 of the final quantum states 148 is determined.

In response to determining at operation 222 that the desired number 168 of the final quantum states 148 is not determined, method 200 goes back to operation 218. In certain embodiments, operations 218 through 222 are performed one or more times until the desired number 168 of the final quantum states 148 is determined.

In response to determining at operation 222 that the desired number 168 of the final quantum states 148 is determined, method 200 continues to operation 224. At operation 224, the quantum processor 144 of the quantum computing system 142 determines a minimum energy 174 among the determined energies 172.

At operation 226, the quantum processor 144 of the quantum computing system 142 determines a target final quantum state 156 that corresponds to the minimum energy 174 among the determined final quantum states 148.

At operation 228, the processor 112 of the learning management system 108 determines the improved learning recommendation 140 from the target final quantum state 156. In certain embodiments, the converter 152 of the quantum computing system 142 converts the target final quantum state 156 represented by quantum bits to a converted target final quantum state 158 represented by classical bits. Subsequently, the quantum processor 144 of the quantum computing system 142 sends the converted target final quantum state 158 to the learning management system 108.

At operation 230, the processor 112 of the learning management system 108 sends the improved learning recommendation 140 to the first user (e.g., user 104-1 of FIG. 1).

At operation 232, the processor 112 of the learning management system 108 determines if an instruction 178 to stop the learning management process is received. In response to determining at operation 232 that the instruction 178 to stop the learning management process is not received, method 200 goes back to operation 202. In certain embodiments, operations 202 through 232 are repeated one or more times until the instruction 178 to stop the learning management process is received. In response to determining at operation 232 that the instruction 178 to stop the learning management process is received, method 200 ends.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
   a memory configured to store:
   learning histories for a plurality of users; and
   a classical processor communicatively coupled to the memory, the classical processor being configured to:
   monitor a user behavior for each user;
   determine a learning history of each user based on a respective user behavior;
   receive a learning requirement for a first user;
   generate a preliminary learning recommendation based on the learning requirement of the first user and the learning histories of the plurality of users;
   filter the preliminary learning recommendation to generate a filtered learning recommendation;
   map a problem of finding an improved learning recommendation from the filtered learning recommendation to a quantum Ising model, wherein a plurality of coupling constants is determined for the quantum Ising model based at least in part upon the filtered learning recommendation;
   a quantum processor communicatively coupled to the classical processor, the quantum processor being configured to:
   prepare an initial quantum state, wherein the initial quantum state is a state of a quantum transverse magnetic field model;
   perform a quantum annealing process a first time, the quantum annealing process comprising:
   evolving the quantum transverse magnetic field model into the quantum Ising model; and
   in response to evolving the quantum transverse magnetic field model into the quantum Ising model, determining a first final quantum state from the initial quantum state;
   determine a first energy of the quantum Ising model for the first final quantum state;
   determine that a target number of final quantum states is not reached;
   in response to determining that the target number of final quantum states is not reached, perform the quantum annealing process a second time;
   determine a second energy of the quantum Ising model for the second final quantum state;
   after performing the quantum annealing process the second time, determine that the target number of final quantum states is reached;
   in response to determining that the target number of quantum states is reached, determine a minimum energy among the first energy and the second energy; and
   determine the target quantum state among the first final quantum state and the second final quantum state, wherein the target quantum state is associated with the minimum energy;
   wherein:
   the quantum processor is further configured to:
   transmit a converted target final quantum state to the classical processor, wherein the converted target final quantum state is represented by a first plurality of classical bits that is converted from a first plurality of quantum bits representing the target final quantum state; and
   the classical processor is further configured to:
   in response to receiving the converted target final quantum state from the quantum processor, determine the improved learning recommendation from the converted target final quantum state; and
   transmit the improved learning recommendation to the first user.

2. The system of claim 1, wherein the initial quantum state is a ground state of a transverse magnetic field model.

3. The system of claim 1, wherein the learning histories of the plurality of users are stored in a blockchain stored in the memory.

4. The system of claim 1, wherein the classical processor is further configured to:
monitor a new user behavior for the first user; and
update a learning history of the first user based on the new user behavior.

5. The system of claim 1, wherein performing the quantum annealing process comprises performing an adiabatic quantum process.

6. The system of claim 1, wherein the quantum annealing process is performed for a target duration.

7. The system of claim 1, wherein performing the quantum annealing process comprises reducing a transverse magnetic field.

8. A method comprising:
monitoring, by a classical processor, a user behavior for each user of a plurality of users;
determining, by the classical processor, a learning history of each user based on a respective user behavior;
receiving, by the classical processor, a learning requirement for a first user;
generating, by the classical processor, a preliminary learning recommendation based on the learning requirement of the first user and learning histories of the plurality of users;
filtering, by the classical processor, the preliminary learning recommendation to generate a filtered learning recommendation;
mapping, by the classical processor, a problem of finding an improved learning recommendation from the filtered learning recommendation to a quantum Ising model, wherein a plurality of coupling constants is determined for the quantum Ising model based at least in part upon the filtered learning recommendation;
preparing, by a quantum processor, an initial quantum state, wherein the initial quantum state is a state of a quantum transverse magnetic field model;
performing, by the quantum processor, a quantum annealing process a first time, the quantum annealing process comprising:
evolving the quantum transverse magnetic field model into the quantum Ising model; and
in response to evolving the quantum transverse magnetic field model into the quantum Ising model, determining a first final quantum state from the initial quantum state;
determining, by the quantum processor, a first energy of the quantum Ising model for the first final quantum state;
determining, by the quantum processor, that a target number of final quantum states is not reached;
in response to determining that the target number of final quantum states is not reached, performing, by the quantum processor, the quantum annealing process a second time;
determining, by the quantum processor, a second energy of the quantum Ising model for the second final quantum state;
after performing the quantum annealing process the second time, determining, by the quantum processor, that the target number of final quantum states is reached;
in response to determining that the target number of quantum states is reached, determining, by the quantum processor, a minimum energy among the first energy and the second energy;
determining, by the quantum processor, a target quantum state among the first final quantum state and the second final quantum state, wherein the target quantum state is associated with the minimum energy;
transmitting, by the quantum processor, a converted target final quantum state to the classical processor, wherein the converted target final quantum state is represented by a first plurality of classical bits that is converted from a first plurality of quantum bits representing the target final quantum state;
in response to receiving the converted target final quantum state from the quantum processor, determining, by the classical processor, the improved learning recommendation from the converted target final quantum state; and
transmitting the improved learning recommendation to the first user.

9. The method of claim 8, wherein the initial quantum state is a ground state of a transverse magnetic field model.

10. The method of claim 8, wherein the learning histories of the plurality of users are stored in a blockchain.

11. The method of claim 8, further comprising:
monitoring a new user behavior for the first user; and
updating a learning history of the first user based on the new user behavior.

12. The method of claim 8, wherein performing the quantum annealing process comprises performing an adiabatic quantum process.

13. The method of claim 8, wherein the quantum annealing process is performed for a target duration.

14. The method of claim 8, wherein performing the quantum annealing process comprises reducing a transverse magnetic field.

15. A non-transitory computer-readable medium storing instructions that, when executed by a classical processor and a quantum processor, cause the classical processor and the quantum processor to:
monitor, by the classical processor, a user behavior for each user of a plurality of users;
determine, by the classical processor, a learning history of each user based on a respective user behavior;
receive, by the classical processor, a learning requirement for a first user;
generate, by the classical processor, a preliminary learning recommendation based on the learning requirement of the first user and learning histories of the plurality of users;
filter, by the classical processor, the preliminary learning recommendation to generate a filtered learning recommendation;
map, by the classical processor, a problem of finding an improved learning recommendation from the filtered learning recommendation to a quantum Ising model, wherein a plurality of coupling constants is determined for the quantum Ising model based at least in part upon the filtered learning recommendation;
prepare, by the quantum processor, an initial quantum state, wherein the initial quantum state is a state of a quantum transverse magnetic field model;
perform, by the quantum processor, a quantum annealing process a first time, the quantum annealing process comprising:

evolving the quantum transverse magnetic field model into the quantum Ising model; and in response to evolving the quantum transverse magnetic field model into the quantum Ising model, determining a first final quantum state from the initial quantum state;

determine, by the quantum processor, a first energy of the quantum Ising model for the first final quantum state;

determine, by the quantum processor, that a target number of final quantum states is not reached;

in response to determining that the target number of final quantum states is not reached, perform, by the quantum processor, the quantum annealing process a second time;

determine, by the quantum processor, a second energy of the quantum Ising model for the second final quantum state;

after performing the quantum annealing process the second time, determine, by the quantum processor, that the target number of final quantum states is reached;

in response to determining that the target number of quantum states is reached, determine, by the quantum processor, a minimum energy among the first energy and the second energy;

determine, by the quantum processor, a target quantum state among the first final quantum state and the second final quantum state, wherein the target quantum state is associated with the minimum energy;

transmit, by the quantum processor, the converted target final quantum state to the classical processor, wherein the converted target final quantum state is represented by a first plurality of classical bits that is converted from a first plurality of quantum bits representing the target final quantum state;

in response to receiving the converted target final quantum state from the quantum processor, determine, by the classical processor, the improved learning recommendation from the converted target final quantum state; and transmit the improved learning recommendation to the first user.

16. The non-transitory computer-readable medium of claim 15, wherein the initial quantum state is a ground state of a transverse magnetic field model.

17. The non-transitory computer-readable medium of claim 15, wherein the learning histories of the plurality of users are stored in a blockchain.

18. The non-transitory computer-readable medium of claim 15, wherein the instructions, when executed by the at least one classical processor and the at least one quantum processor, further cause the at least one classical processor and the at least one quantum processor to:

monitor a new user behavior for the first user; and update a learning history of the first user based on the new user behavior.

19. The non-transitory computer-readable medium of claim 15, wherein performing the quantum annealing process comprises performing an adiabatic quantum process.

20. The non-transitory computer-readable medium of claim 15, wherein performing the quantum annealing process comprises reducing a transverse magnetic field.

* * * * *